US006067719A

United States Patent [19]

Forman

[11] Patent Number: 6,067,719

[45] Date of Patent: May 30, 2000

[54] RATIO RULER FOR COMPARATIVE JUDGMENTS

[75] Inventor: Ernest H. Forman, McLean, Va.

[73] Assignee: Expert Choice, Inc., Pittsburgh, Pa.

[21] Appl. No.: 08/967,888

[22] Filed: Nov. 12, 1997

[51] Int. Cl.[7] ....... G01B 3/04

[52] U.S. Cl. ....... 33/15 D; 33/15 B; 33/485; 434/322

[58] Field of Search ....... 33/15 D, 15, 15 B, 33/483, 484, 485, 486, 487, 562, 464, 452, 520, 494; 434/322, 353, 354, 433

[56] References Cited

U.S. PATENT DOCUMENTS

| | | | |
|---|---|---|---|
| Re. 11,450 | 10/1894 | Steck | 33/486 |
| 346,371 | 7/1886 | Humphrey | 33/520 |
| 3,144,716 | 8/1964 | Cich | 33/486 |
| 4,750,270 | 6/1988 | Kundikoff | 33/494 |

*Primary Examiner*—Christopher W. Fulton
*Attorney, Agent, or Firm*—McDermott, Will & Emery

[57] ABSTRACT

A ruler device for eliciting judgements about the ratio of factors includes a first base member having first indicia indicating the ratio of factors, and a second base member slidably mounted to the first base member. The second base member moves longitudinally along the first base member, and has second indicia indicating an optical weighing of the factors. The second indicia is adjacent with the first indicia and alignable with respect thereto by relative movement of the first and second base members with respect to each other. When the second indicia are aligned with the first indicia in accordance with a predetermined manner, a value of the ratio of the factors is determined therefrom.

14 Claims, 5 Drawing Sheets

1 10 20 18 14 15 16 12
99 10 8 4 3 2 1 1 2 3 4 8 10 99
22 24

RATIO RULER FOR COMPARATIVE JUDGMENTS

TECHNICAL FIELD

This invention relates to ruler devices, and more particularly, to ruler devices for determining the ratio of value pairs when eliciting comparative judgments in response to a questionnaire or survey.

BACKGROUND ART

Surveys and questionnaires have become quite commonplace as a means to elicit judgments about nearly everything. From how we rate the aesthetic appeal of an automobile model to our favorite movies, it is increasingly common to find at our disposal a survey or questionnaire asking us our opinion of, for example, the car dealership or the popcorn at the movies. Typical questionnaires or surveys query respondents to rate or evaluate a plurality of factors at one time. It is quite common to utilize a scale, for example, below average—average—above average, to rate the relative performance of a person or organization. Another common scale is an ordinal scale, commonly referred to as a Likert scale, whereby a respondent is asked to judge on a scale of 1–5, where 1 is strongly agree and 5 is strongly disagree, with the proposition queried.

Oftentimes results of surveys or questionnaires are summarized in order to compare the responses for different items for such purposes as deriving priorities. Frequency distributions of the results are also used to graphically portray the results of the items on the survey. Measures of central tendency, such as averages, is also utilized as a means to present survey results. In this way, the average response of each survey item can be used to assign priorities to the items by the user of the survey. However, in order for an average to be mathematically meaningful, the measure must be interval or ratio level measure.

Analytic Hierarchy Process (AHP) is a widely used method for prioritization, as well as decision making and forecasting. AHP utilizes pairwise relative comparisons and eigenvector calculations to calculate ratio scale priorities for the factors being considered. Pairwise comparisons have been found to be easier for respondents to make (e.g. how much do you prefer A more than B?), as well as being more accurate over absolute judgments (e.g. do you like A or B?). This eigenvector calculation is robust in that accurate ratio scale priorities can be obtained even from imprecise verbal judgments from respondents. However, the more imprecise the individual pairwise judgments, the more important is the use of redundant judgments, that is, more than the minimum required for a mathematical solution, in determining the sought after priorities.

When using AHP with a computer program such as the known program "Expert Choice," the user can make verbal, numerical or graphical pairwise comparisons. I have determined that graphical judgments tend to be more accurate than verbal judgments and thus require less redundancy. Additionally, I have determined that graphical judgments are easier for a respondent to justify than a precise numerical judgment (e.g. A is 2.73 times B).

Of the three pairwise modes available with computer displays, verbal, numerical and graphical, only graphical cannot easily be performed via a pencil and paper survey. Eliciting graphical ratio level responses having the highest level of accuracy and therefore requiring the least redundancy from respondents is not an easy task.

It is accordingly one object of the present invention to provide an apparatus that will enable users of surveys and questionnaires to elicit graphical ratio level responses from respondents.

Another object of the present invention is to provide an apparatus for determining the subjective relative ratio level of factors under consideration by a user.

DISCLOSURE OF THE INVENTION

The invention is directed to a ratio ruler device for eliciting judgements about the ratio of factors, and the method for using the device. The device, according to the present invention, is a ruler device having two moveable members, each member having indicia calibrated to indicate the ratio of two factors under consideration.

More specifically, the ratio ruler of the present invention includes a first base member and a second base member. The second base member is slidably mounted to the first member so that the second member moves longitudinally along the first member. Assembled in this manner, indicia may be placed on one or both of the members.

In the preferred embodiment, first indicia on the first member indicates the numerical ratio of factor, while the second indicia placed on the second member indicates the optical weighing of the factors under consideration. The second indicia is such that it is adjacent to the first indicia and alignable by relative movement of the first and second members. The first and second indicia are interrelated such that when the second indicia optically represents the ratio of the factors under observation, the second member, and therefore the second indicia, aligns with the first indicia, whereby the numerical ratio of the second indicia can be determined from the first indicia.

Thus, the ratio ruler graphically portrays the relative strength or merit of two factors by adjusting the ruler such that the numerical ratio from the second indicia is the numerical representation of the graphical representation of the first indicia.

In accordance with one embodiment of the invention, a ruler device for eliciting judgements about the ratio of factors includes a first base member having first indicia indicating the ratio of factors, and a second base member slidably mounted to the first base member. The second base member moves longitudinally along the first base member, and has second indicia indicating an optical weighing of the factors. The second indicia is adjacent with the first indicia and alignable with respect thereto by relative movement of the first and second base members with respect to each other. When the second indicia are aligned with the first indicia in accordance with a predetermined manner, a value of the ratio of the factors is determined therefrom.

In accordance with another embodiment of the invention, a ruler device for eliciting judgements about the ratio of factors includes a first base member, and a second base member slidably mounted to the first base member so that the second base member moves longitudinally along the first base member. The first indicia on the first base member indicate the ratio of factors, and the second indicia on the second base member indicate an optical weighing of the factors. The second indicia are adjacent with the first indicia, and alignable by relative movement of the first and second base members with respect to each other. The first and second indicia are interrelated such that when the second indicia optically represents the ratio of the factors under observation, the second base member and the second indicia align with the first indicia, and a value of the ratio of the factors is determined therefrom.

In accordance with another embodiment of the invention, a method for using a ruler device for eliciting judgements about the ratio of factors includes providing a first base member having first indicia indicating the ratio of factors, and providing a second base member slidably mounted to said first base member so that said second base member is movable longitudinally along said first base member. The second base member has second indicia indicating an optical weighing of the factors. The method also includes aligning the second indicia adjacent with the first indicia by relative movement of the first and second base members with respect to each other, and determining a value of the ratio of the factors when the second indicia are aligned with the first indicia. Still other objects and advantages of the present invention will become readily apparent to those skilled in the art from the following detailed description, where I have shown and described only the preferred embodiment of the invention, simply by way of illustration of the best mode contemplated by me of carrying out my invention. As will be realized, the invention is capable of other and different embodiments, and its several details are capable of modifications in various obvious respects, all without departing from the invention. Accordingly, the drawings and descriptions are to be regarded as illustrative in nature, and not as restrictive.

BEST MODE FOR CARRYING OUT THE INVENTION

The present invention is directed to a unique apparatus for the determination of graphical ratio level responses to questions requiring such responses. Use of a ruler type apparatus enables a user to translate a graphical comparison of parameter pairs for comparative judgments into numerical equivalents in response to a questionnaire or survey.

Figure 1:
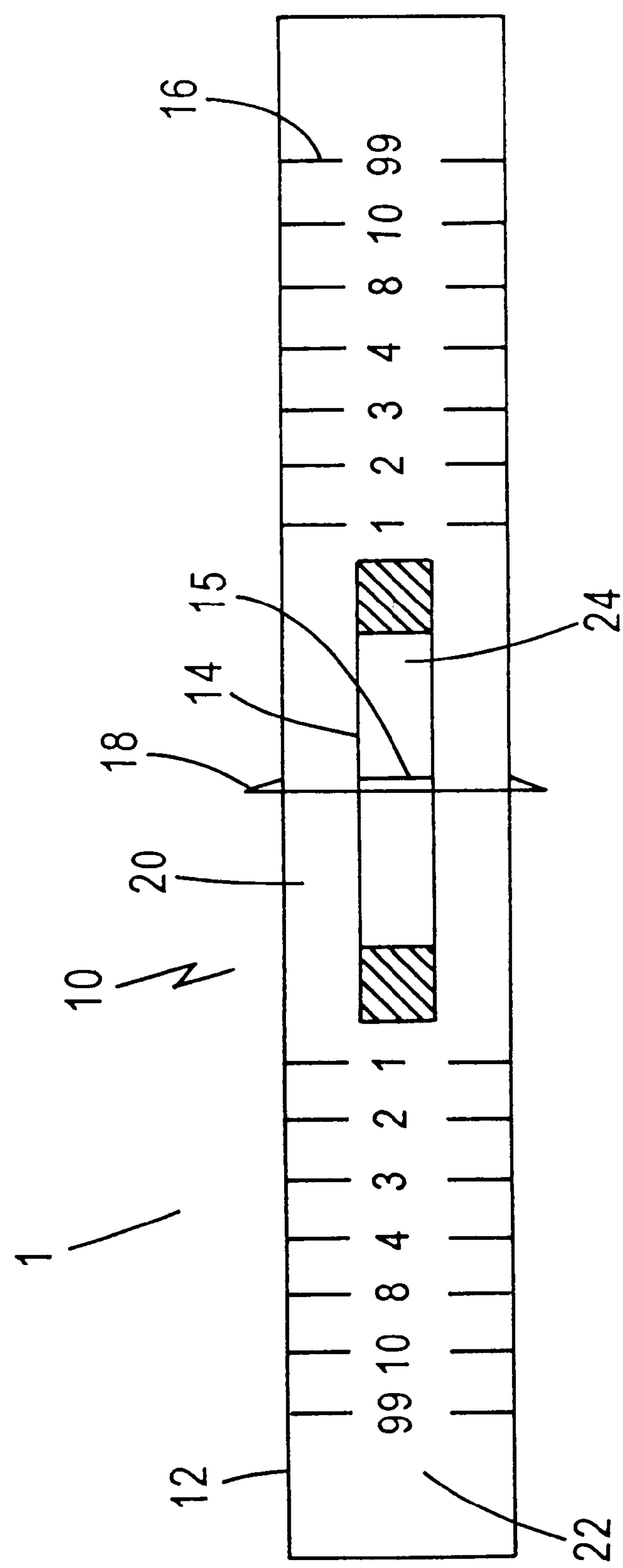
FIG. 1 is a front plan view of the ruler device at an initial position.

Referring now to the embodiment depicted in FIG. 1, a ratio ruler 10 includes a flat, rectangular base member 12 having a front face 22. A slide member 14, having a front face 24, is slidably attached to the base member 12 using clip 18. The clip 18 is generally positioned near the center of the base member 12, generally logically bisecting the longitudinal dimension, and allowing free movement of the slide member 14 longitudinally along the base member 12.

Located on the front face 22 of the base member 12 is the first indicia 16. This first indicia 16 has calibrated graduations for indicating the numerical equivalents of the ratio of a pair of factors being considered when this apparatus is in use. Depicted in FIG. 1, this indicia may take the form of a scale indicating the relative strength of a first factor when compared to a second factor. The indicia 16 appears on equally opposing sides of the front face 22, allowing the user to determine the ratio as a pair, that is, factor A to factor B as 8:2 or 99:1. The actual calibrated graduations can represent any ratio scale that is appropriate for the kind of measurement sought after. Further, indicia 16 may only appear on one side of front face 22.

Located on the front face 24 of the slide member 14 is the second indicia 21. This second indicia 21 has shading situated on equally opposing sides of the front face 24 for indicating the graphical equivalents of the ratio of a pair of factors being considered when this apparatus is in use. Depicted in FIG. 1, this indicia may take the form of shading equidistant from the center on both ends of the front surface 24, indicating the relative strength of a first factor when compared to a second factor. The indicia 21 appears on equally opposing longitudinal sides of the front face 24, allowing the user to determine the ratio, graphically, of a pair of parameters under consideration.

Figure 2:
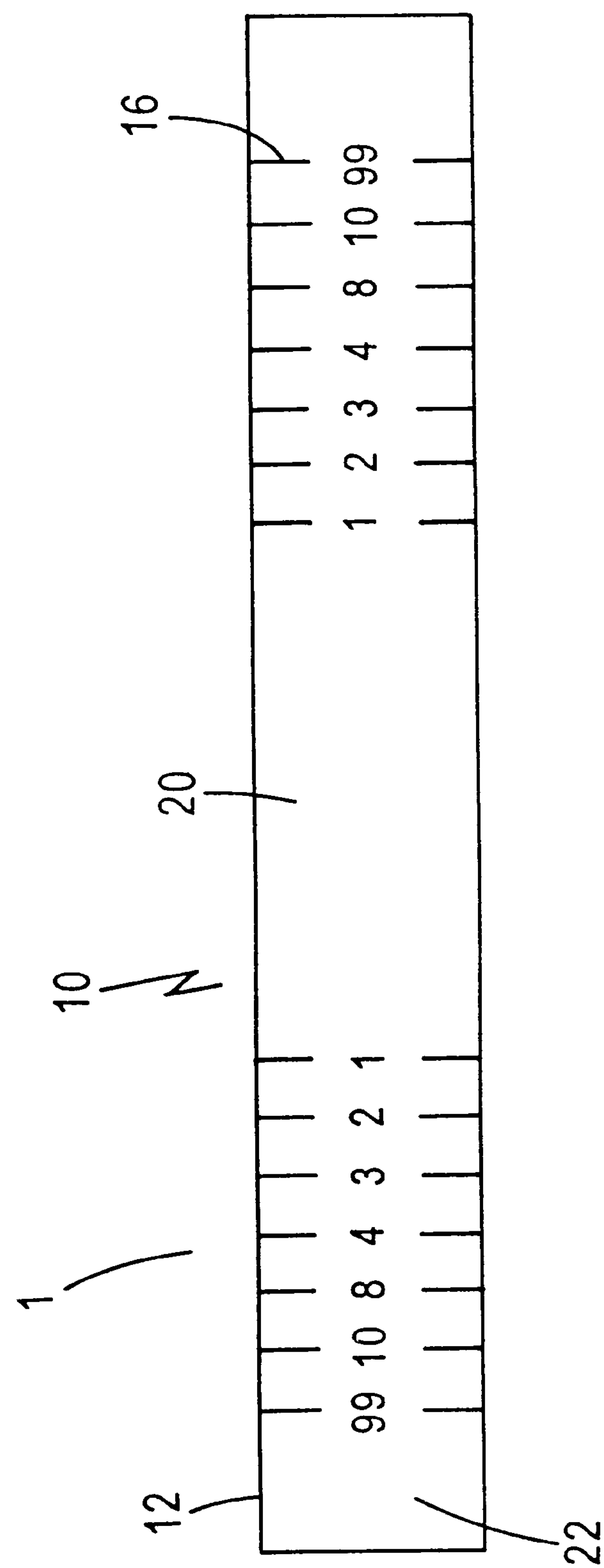
FIG. 2 is a front plan view of the base member of the ratio ruler.
Figure 3:
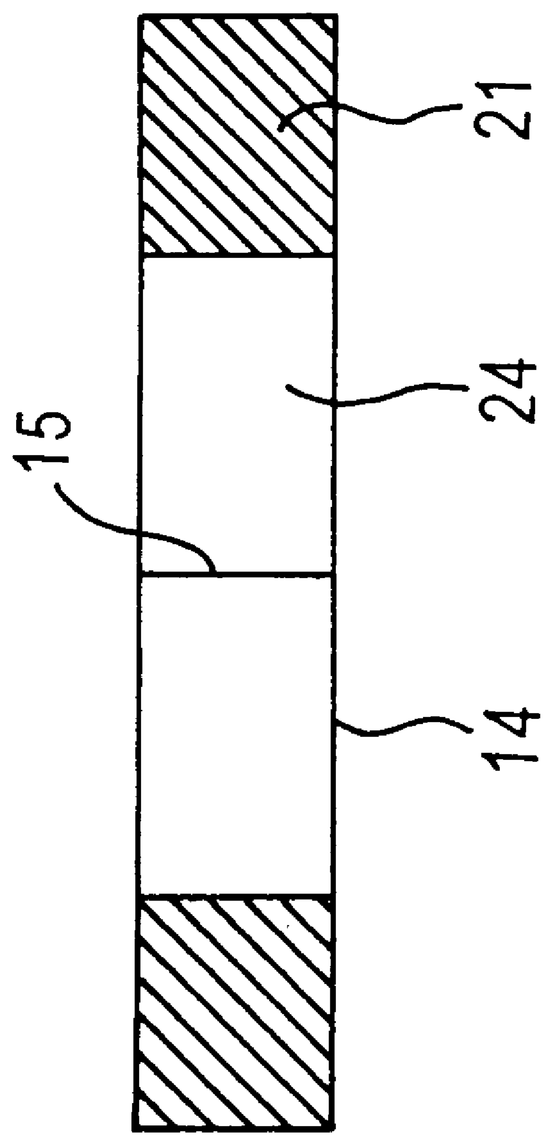
FIG. 3 is a front plan view of the slide member of the ratio ruler.
Figure 4:
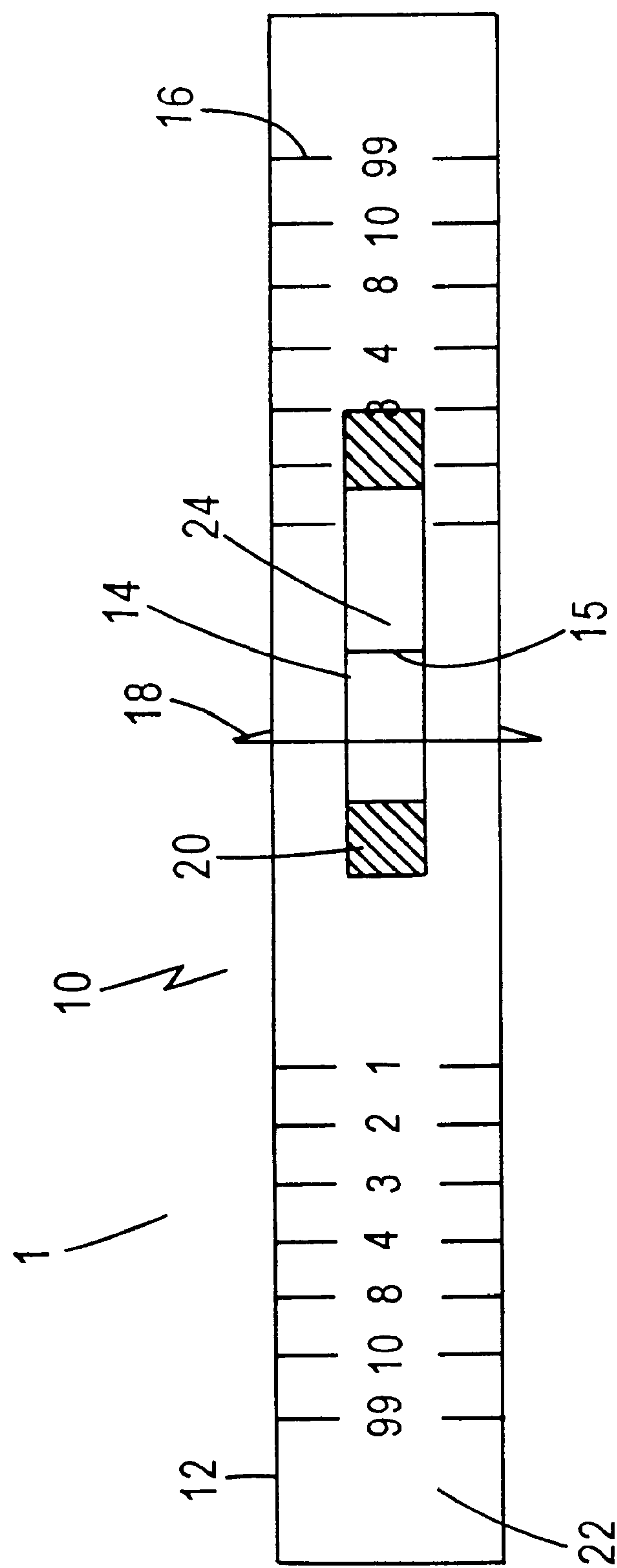
FIG. 4 is a front plan view of the ruler device at a position responsive to user input.
Figure 5:
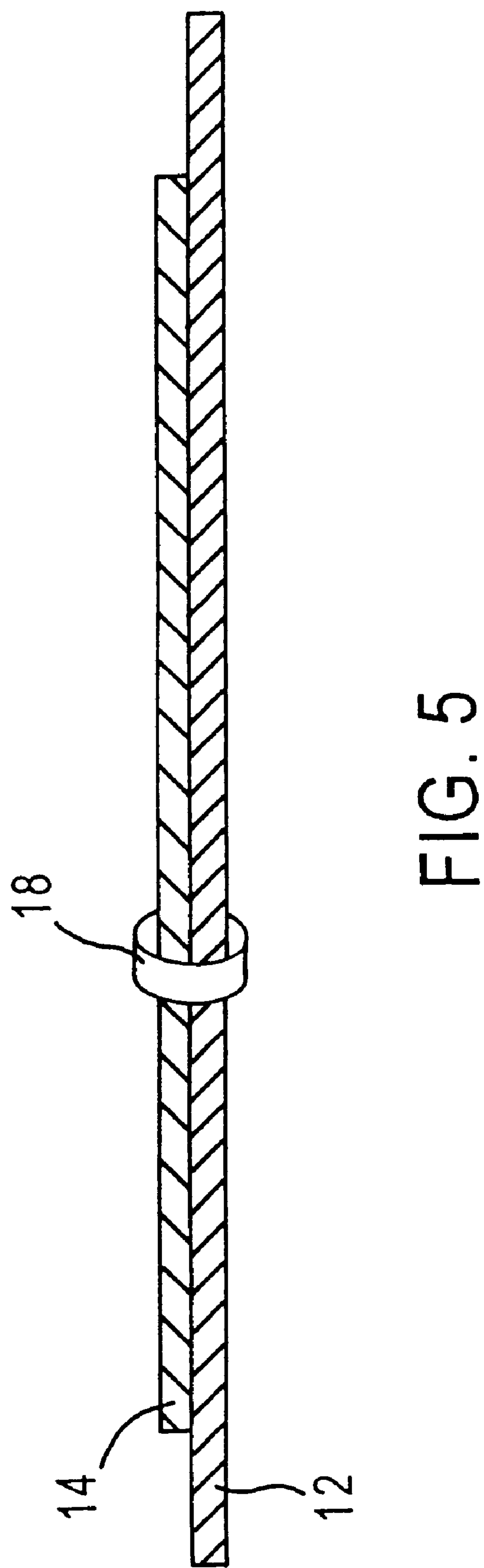
FIG. 5 is a side view of the ruler device.

FIG. 2 is a front plan view of the base member of the ratio ruler, and FIG. 3 is a front plan view of the slide member of the ratio ruler. FIG. 4 is a front plan view of the ruler device at a position responsive to user input, where alignment between the first and second members causes alignment with respect to the first and second indicia, where the shading on the first member is preferably more than the shading on the second member, or vice versa. FIG. 5 is a side view of the ruler device, illustrating clip 18 is greater detail. Other types of clips or alignment mechanisms may be used to movably affix the first and second base members to each other.

As indicated above, various comparative scales or schemes may be used, including, for example, symbols, colors and the like, that allow or facilitate the observer to make comparisons graphically. Further indicia 20 may appear on one side of slide member 14, or on both sides.

In an alternative arrangement, base member 12 has a recess in the front face 22 such that the second member 14 fits inside the recess. The recess, not shown, shall be longer than the second member 14, thereby allowing the second member 14 to slide within the base member 12. Other alternative arrangements are considered within the scope of the present invention, such as the use of transparent material to construct the ratio rule, as is fairly standard in rulers, as well other constructions that preserve the basic graphical comparative scheme described herein.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A ruler device for eliciting judgments about the ratio of factors comprising:

a first base member;

a second base member slidably mounted to said first base member so that said second base member moves longitudinally along said first base member;

first indicia on said first base member indicating an optical weighing of factors;

second indicia on said second base member indicating the ratio of the factors, said second indicia adjacent with the first indicia and alignable by relative movement of the first and second base members with respect to each other;

the first and second indicia interrelated such that when the second indicia optically represents the ratio of the factors under observation, said second base member and the second indicia align with the first indicia, and a value of the ratio of the factors is determined therefrom;

wherein the first indicia comprises a pair of diametrically opposite numerical scales on opposite ends of said first base member.

2. A ruler device according to claim 1, wherein the first indicia is a numerical scale.

3. A ruler device according to claim 2, wherein the numerical scale has graduated units.

4. A ruler device according to claim 3, wherein the graduated units are indicative of a ratio scale.

5. A ruler device according to claim 1, wherein the second indicia includes a center line on said second base member for alignment with said first base member.

6. A ruler device according to claim 1, wherein the factors are in pairs.

7. A ruler device according to claim 1, wherein said second base member has a length generally corresponding to the distance between the numerical scales on opposite ends of said first base member.

8. A ruler device according to claim 1, wherein the second indicia is disposed on opposite ends of said second base member for positioning relative to the first indicia.

9. A ruler device for enabling both graphical and numerical visual indications of ratios of factors for eliciting judgments by a user, comprising:

a base member containing longitudinally extending numerical indicia representing ratios of factors;

a movable member mounted to the base member and arranged for longitudinal movement thereon whereby an end of the movable member may be manually aligned to a user selected numerical ratio of factors;

a reference marker element fixed to a prescribed region of said base member and overlapping at least a portion of said movable member wherein, when an end of the movable member is aligned with the selected numerical ratio of factors, the position of the movable member with respect to said reference marker element provides a graphical designation of the numerical ratio of factors to which the movable member is aligned.

10. A ruler as claimed in claim 9, in which the reference marker element is fixed to the center of said base member.

11. A ruler as claimed in claim 9, in which the reference marker element encircles, and forms a guide sleeve for, said movable member.

12. A ruler as claimed in claim 9, wherein said movable member includes a center marking for initial alignment with said reference marker element.

13. A ruler as claimed in claim 9, wherein an end of said movable member is shaded for visual demarcation.

14. A ruler as claimed in claim 9, wherein the base member is greater in length than said movable member.

* * * * *